(12) United States Patent
Eun

(10) Patent No.: US 10,419,633 B2
(45) Date of Patent: Sep. 17, 2019

(54) DEVICE AND INFORMATION PROCESSING METHOD

(71) Applicant: Jongsook Eun, Tokyo (JP)

(72) Inventor: Jongsook Eun, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 33 days.

(21) Appl. No.: 15/725,674

(22) Filed: Oct. 5, 2017

(65) Prior Publication Data

US 2018/0103170 A1    Apr. 12, 2018

(30) Foreign Application Priority Data

Oct. 11, 2016  (JP) .................................. 2016-200070

(51) Int. Cl.
| | | |
|---|---|---|
| G06K 15/00 | (2006.01) | |
| H04N 1/00 | (2006.01) | |
| G06F 3/12 | (2006.01) | |

(52) U.S. Cl.
CPC ..... *H04N 1/00941* (2013.01); *H04N 1/00042* (2013.01); *H04N 1/00307* (2013.01); *H04N 1/00896* (2013.01); *H04N 2201/0094* (2013.01)

(58) Field of Classification Search
None
See application file for complete search history.

(56) References Cited

U.S. PATENT DOCUMENTS

| | | |
|---|---|---|
| 6,571,333 B1 | 5/2003 | Jain et al. |
| 7,663,778 B2 | 2/2010 | Eun |
| 8,127,090 B2 | 2/2012 | Eun et al. |
| 8,400,648 B2 | 3/2013 | Eun et al. |
| 8,423,781 B2 | 4/2013 | Eun et al. |
| 8,752,159 B2 | 6/2014 | Eun et al. |
| 9,565,326 B2 | 2/2017 | Eun |
| 9,633,188 B2 | 4/2017 | Eun |
| 2012/0110286 A1* | 5/2012 | Yaoyama ............... G06F 1/3234 711/161 |
| 2016/0217084 A1 | 7/2016 | Eun |
| 2016/0275274 A1 | 9/2016 | Eun |
| 2017/0052587 A1 | 2/2017 | Eun |

FOREIGN PATENT DOCUMENTS

| | | |
|---|---|---|
| JP | 2002-229692 | 8/2002 |
| JP | 3701910 | 10/2005 |
| JP | 2012-128624 | 7/2012 |
| JP | 2012-198690 | 10/2012 |
| JP | 5906018 | 4/2016 |

\* cited by examiner

*Primary Examiner* — Dov Popovici
(74) *Attorney, Agent, or Firm* — IPUSA, PLLC

(57) ABSTRACT

A device is provided that includes an operation unit having a program installed therein and including a processor that is configured to execute a first monitoring process of monitoring an arrival of a first time that is set up in advance, and a setting process of setting up the first time to be monitored in the first monitoring process in response to a request from the program. When the arrival of the first time is detected in the first monitoring process, the setting process causes the program to recover from a transitioned state to which the program transitions when the operation unit is in a power-saving mode.

17 Claims, 6 Drawing Sheets

FIG.5A

- APP IDENTIFIER: jp.co.rrrr.app1
- REFERENCE TIME: 10:15
- TIME INTERVAL: 180 MIN

FIG.5B

- APP IDENTIFIER: jp.co.rrrr.app2
- REFERENCE TIME: 11:15
- TIME INTERVAL: 480 MIN

FIG.6

RECOVERY TIME LIST

T1:

| APP IDENTIFIER | | | | | | | | | |
|---|---|---|---|---|---|---|---|---|---|
| (1) jp.co.rrrr.app1 | 10:15 | 13:15 | 16:15 | 19:15 | 22:15 | 01:15 | 04:15 | 07:15 | |
| (2) jp.co.rrrr.app2 | 11:15 | 19:15 | 03:15 | | | | | | |

T2:

| RECOVERY TIME | 10:15 | 11:15 | 13:15 | 16:15 | 19:15 | 22:15 | 01:15 | 03:15 | 04:15 | 07:15 |
|---|---|---|---|---|---|---|---|---|---|---|
| APP IDENTIFIER | (1) | (2) | (1) | (1) | (1) (2) | (1) | (1) | (2) | (1) | (1) |

DEVICE AND INFORMATION PROCESSING METHOD

CROSS-REFERENCE TO RELATED APPLICATIONS

The present application claims priority under 35 U.S.C. § 119 to Japanese Patent Application No. 2016-200070 filed on Oct. 11, 2016, the entire contents of which are incorporated herein by reference.

BACKGROUND OF THE INVENTION

1. Field of the Invention

The present invention relates to a device and an information processing method.

2. Description of the Related Art

Various devices including image forming apparatuses have features for operating in power-saving mode, which is an operation mode that can reduce power consumption. For example, a device may transition to power-saving mode during a time the device is not used or when the device continues to be idle for over a certain time period. In this way, power consumption of the device at an office or some other installation location of the device can be reduced, for example.

On the other hand, when a user attempts to use the device that is in power-saving mode, time is required for switching the device back to normal mode that allows functions of the device to be used, and the user may have to wait.

In this respect, measures are available for allowing certain programs, such as applications necessary for implementing functions of the device, to remain executable even in power-saving mode. Such applications and programs that remain executable are hereinafter referred to as "resident app".

Also, in view of the popularity of information processing terminals including smartphones and tablet terminals, there are electronic devices including home appliances and office equipment that are capable of cooperating with such information processing terminals. For example, an information processing terminal may be provided as an operation unit (e.g., operation panel) of a device (e.g., multifunctional peripheral), and in this case, the information processing terminal that is used as the operation unit of the device may also have the feature of transitioning to power-saving mode.

Such an information processing terminal may have its own OS (operating system). As such, when an information processing terminal is used as an operation unit of a device, applications need to be provided not only in the device as the main unit but also the information processing terminal that is used as the operation unit of the device.

That is, by installing resident apps in the information processing terminal, a prompt response may be made with respect to a user operation even when the information processing terminal is in power-saving mode.

However, in some cases, resident apps may not be readily implemented in such an information processing terminal depending on the OS configuration. For example, in Android (registered trademark), all applications are deactivated when the information processing terminal transitions to power-saving mode.

SUMMARY OF THE INVENTION

According to one embodiment of the present invention, a device is provided that includes an operation unit having a program installed therein and including a processor that is configured to execute a first monitoring process of monitoring an arrival of a first time that is set up in advance, and a setting process of setting up the first time to be monitored in the first monitoring process in response to a request from the program. When the arrival of the first time is detected in the first monitoring process, the setting process causes the program to recover from a transitioned state to which the program transitions when the operation unit is in a power-saving mode.

BRIEF DESCRIPTION OF THE DRAWINGS

FIGS. 5A and 5B are diagrams illustrating examples of recovery time information;

FIG. 6 is a diagram illustrating an example configuration of a recovery information storage unit.

DESCRIPTION OF THE EMBODIMENTS

One aspect of the present invention is directed to providing a technique for reducing influences of power-saving mode on programs installed in an operation unit of a device.

In the following, embodiments of the present invention are described with reference to the accompanying drawings.

Figure 1:
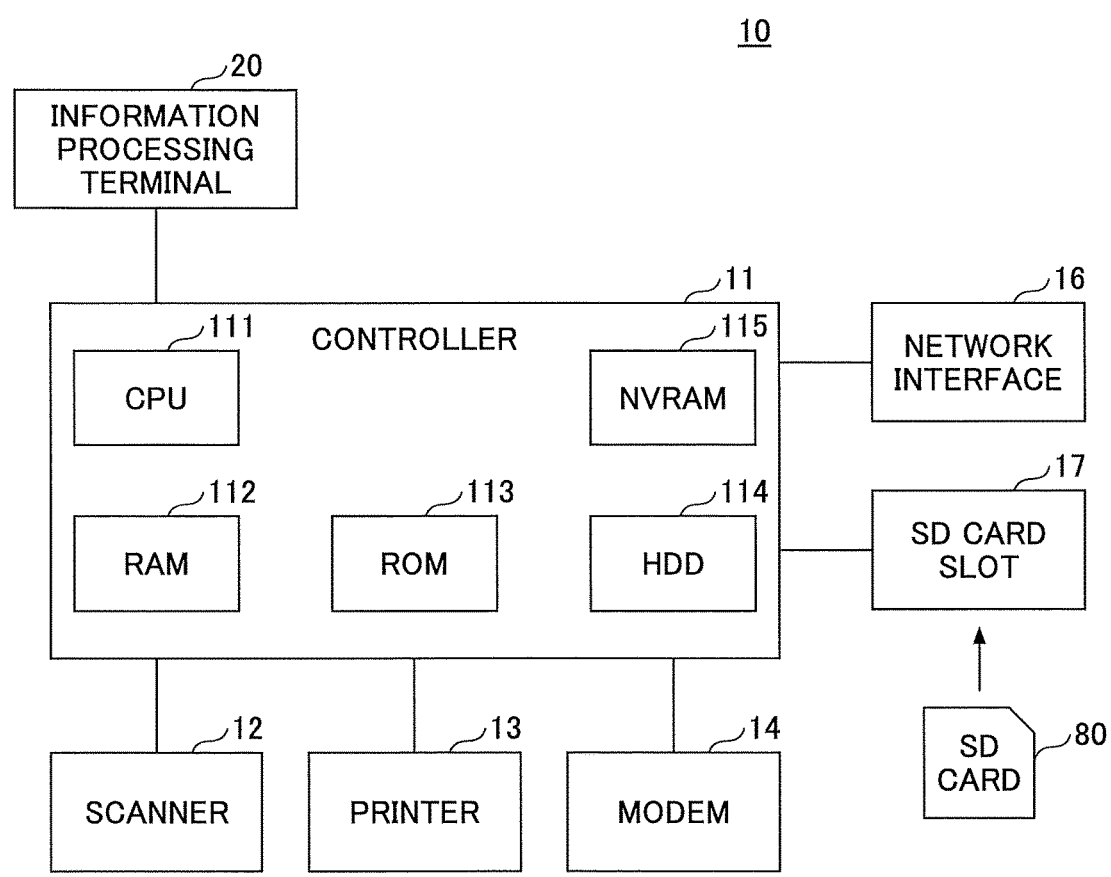
FIG. 1 is a diagram illustrating an example hardware configuration of an image forming apparatus according to an embodiment of the present invention.

FIG. 1 is a diagram illustrating an example hardware configuration of an image forming apparatus 10 according to an embodiment of the present invention. In FIG. 1, the image forming apparatus 10 includes hardware, such as a controller 11, a scanner 12, a printer 13, a modem 14, a network interface 16, and an SD card slot 17.

The controller 11 is a computer (information processing device) included in a main unit of the image forming apparatus 10. In FIG. 1, the controller 11 includes a CPU 111, a RAM 112, a ROM 113, an HDD 114, and an NVRAM 115. The ROM 113 stores various programs and data used by the various programs, for example. The RAM 112 is used as a storage area for loading a program and a work area for the loaded program, for example. The CPU 111 implements various functions by executing processes based on the program loaded in the RAM 112. The HDD 114 stores various programs and data used by the various programs, for example. The NVRAM 115 stores various types of setting information, for example.

The scanner 12 is hardware (image scanning unit) for scanning a document and acquiring image data of the document. The printer 13 is hardware (printing unit) for printing print data on a print medium, such as paper. The modem 14 is hardware for establishing connection with a telephone line, and is used for transmission/reception of image data by facsimile communication. The network interface 16 is hardware for establishing connection with a network, such as a LAN (local area network, which may be wired or wireless). The SD card slot 17 is used for reading a program stored in an SD card 80. That is, in the image forming apparatus 10, not only a program stored in the ROM 113 but also a program stored in the SD card 80 can be loaded into the RAM 112 and executed. Note that the SD card 80 may be replaced by another recording medium (e.g., a CD-ROM or a USB (Universal Serial Bus) memory). That is, the recording medium used to implement the functions of the SD card 80 of the present embodiment is not limited to a particular type of recording medium. In this case, the SD card slot 17 may be replaced by hardware corresponding to the type of the recording medium used.

Also, an information processing terminal 20 is connected to the controller 11. The information processing terminal 20 may be a smart terminal, such as a smartphone or a tablet terminal, corresponding to a portable communication terminal that is capable of communicating with the image forming apparatus 10 via short-range wireless communication, for example. A smartphone is a terminal having multiple functions, such as a call function of a mobile phone, an imaging function of a camera, and a web information display function of a PC, for example. A tablet terminal is a tablet-type device having multiple functions similar to those of a smartphone. Although smartphones and tablet terminals are typical examples of devices referred to as smart terminals, the present invention is not limited to using these types of devices. In the present embodiment, the information processing terminal 20 functions as an operation unit of the image forming apparatus 10. More specifically, the information processing terminal 20 is connected to the controller 11 in place of an operation panel conventionally installed as an operation unit dedicated to the image forming apparatus 10. The controller 11 and the information processing terminal 20 may be connected via a USB cable, short-distance wireless communication, or a communication line, such as a LAN, for example.

Figure 2:
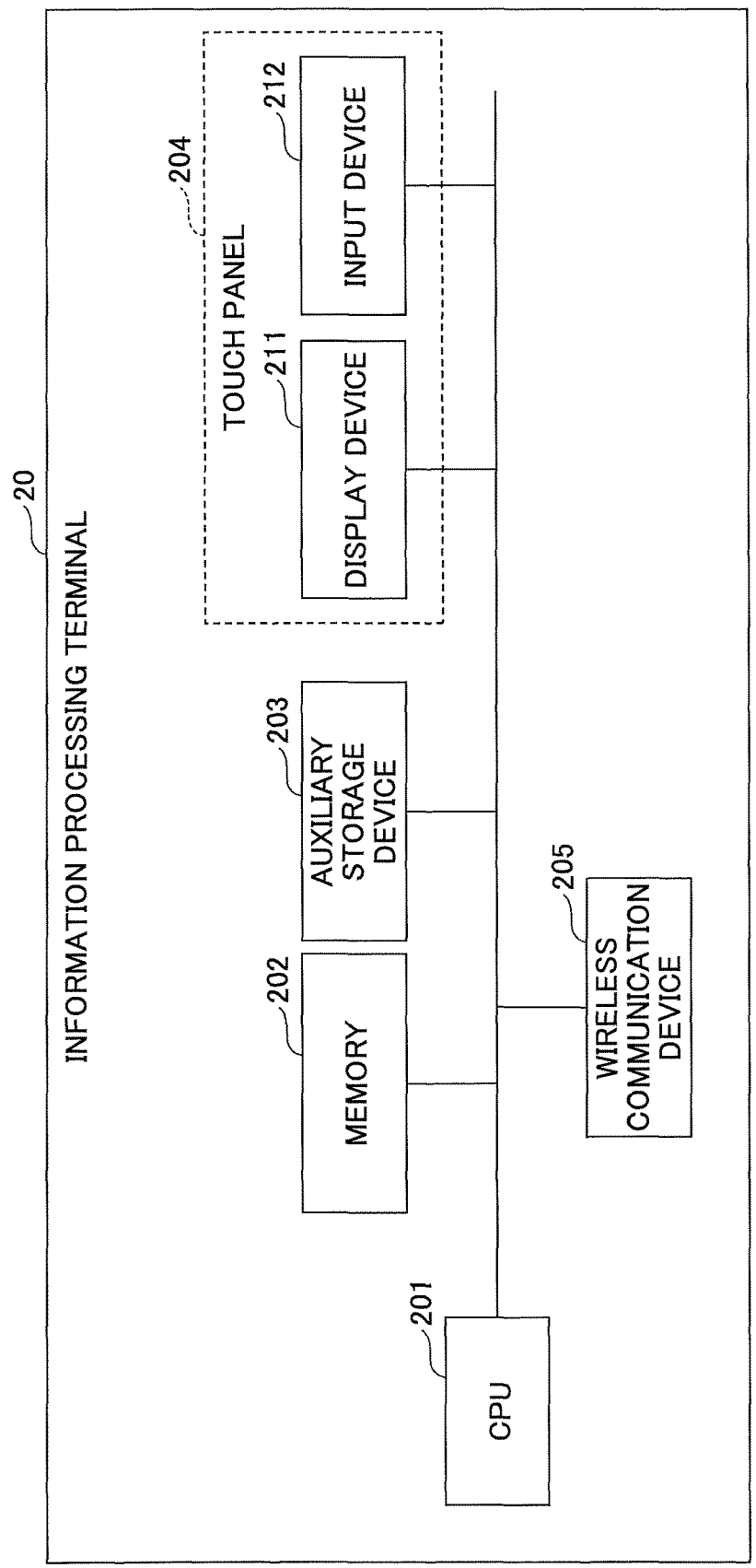
FIG. 2 is a diagram illustrating an example hardware configuration of an information processing terminal according to an embodiment of the present invention.

FIG. 2 is a diagram illustrating an example hardware configuration of the information processing terminal 20 according to an embodiment of the present invention. In FIG. 2, the information processing terminal 20 includes a CPU 201, a memory 202, an auxiliary storage device 203, a touch panel 204, and a wireless communication device 205.

The auxiliary storage device 203 stores programs installed in the information processing terminal 20, for example. The memory 202 reads out a program from the auxiliary storage device 203 and stores the program in response to an instruction to activate the program. The CPU 201 implements functions of the information processing terminal 20 by executing processes based on the program stored in the memory 202.

The touch panel 204 is an electronic component having both an input function and a display function. The touch panel 204 displays information and accepts an input from a user, for example. The touch panel 204 includes a display device 211 and an input device 212.

The display device 211 may be a liquid crystal display, for example, and implements the display function of the touch panel 204. The input device 212 is an electronic component including a sensor that detects contact of an object coming into contact with the display device 211. The method used to detect the contact of the object may be any known method, such as an electrostatic method, a resistive film method, or an optical method, for example. Note that the object that is detected is an object that comes into contact with a contact surface (surface) of the touch panel 204. An example of such an object may be a finger of a user or a dedicated/general pen, for example.

The wireless communication device 205 is an electronic component, such as an antenna, required for establishing communication in a wireless LAN (Local Area Network) or a mobile communication network, for example. Note that in the present embodiment, the information processing terminal 20 does not necessarily have to include the wireless communication device 205.

Figure 3:
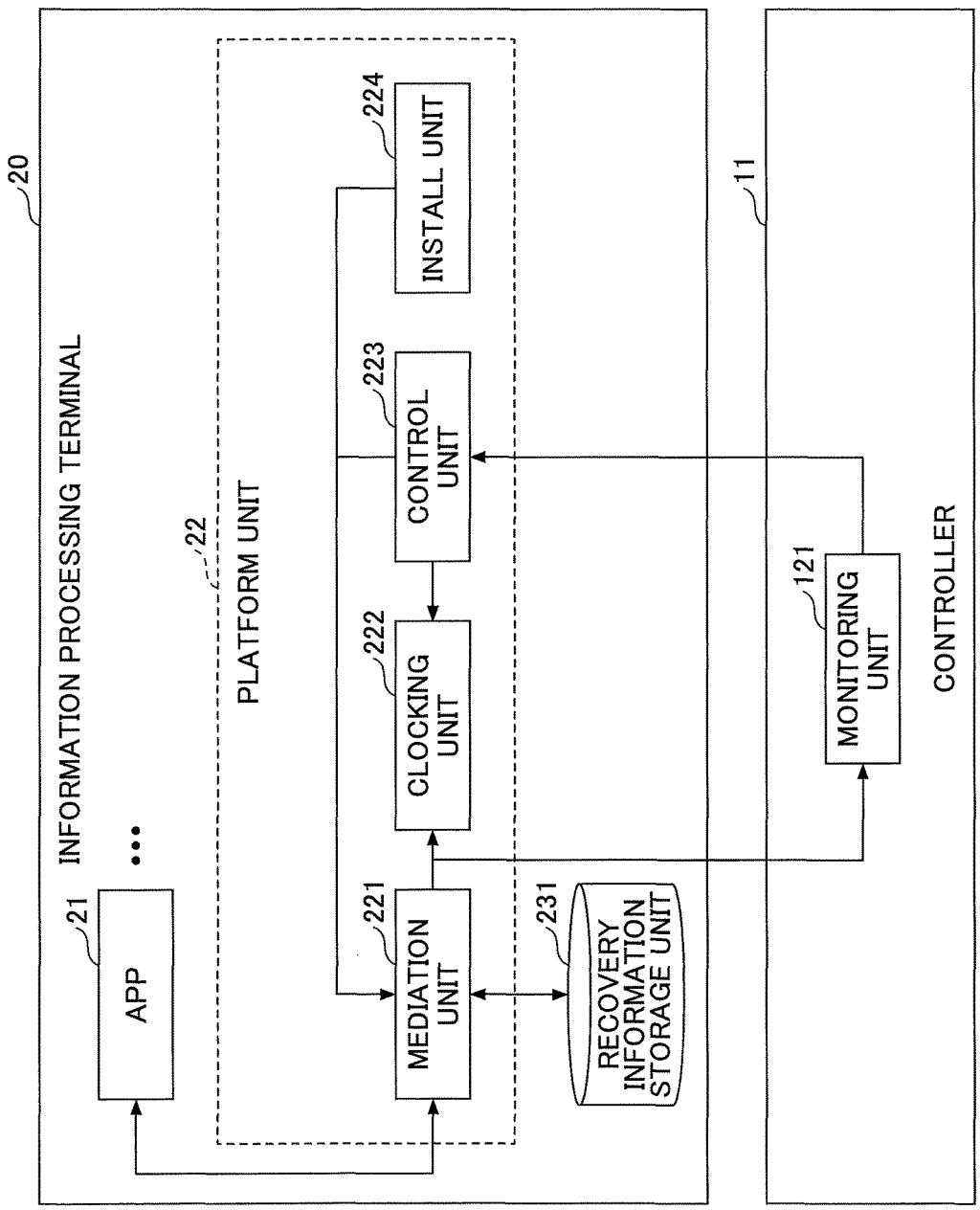
FIG. 3 is a diagram illustrating an example functional configuration of the image forming apparatus according to an embodiment of the present invention.

FIG. 3 is a diagram illustrating an example functional configuration of the image forming apparatus 10 according to an embodiment of the present invention. In FIG. 3, the information processing terminal 20 includes one or more apps 21 and a platform unit 22. These functional elements may be implemented by the CPU 201 executing a process based on one or more programs installed in the information processing terminal 20, for example. The information processing terminal 20 also includes a recovery information storage unit 231. The recovery information storage unit 231 may be implemented by the memory 202 and/or the auxiliary storage device 203, for example.

The app 21 is an application program that is installed in and run on the information processing terminal 20. For example, the app 21 may execute a process periodically or at a predetermined time. For example, the app 21 may be a program for implementing a function of deleting data that has been stored in the auxiliary storage device 203 of the information processing terminal 20 or the HDD 114 of the controller 11 for over a certain time period and may be executed at the time the information processing terminal 20 is activated, at a fixed time, or periodically. Examples of the data to be deleted include print data and/or log data. Note, however, that the functions of the app 21 are not particularly limited in the present embodiment.

The platform unit 22 functions as a platform (execution environment) of the app 21. For example, the platform unit 22 may include an API (Application Program Interface) for controlling the controller 11, the scanner 12, and the printer 13 in response to a request from the app 21. In the present embodiment, the platform unit 22 includes a mediation unit 221, a clocking unit 222, a control unit 223, and an install unit 224, for example.

The mediation unit 221 receives from each app 21, a recovery time setting request for setting up a recovery time of the app 21. The recovery time refers to the time at which the app 21 that is in a non-operating state (transitioned state) as a result of the information processing terminal 20 being in power-saving mode is to recover to an operating state. The power-saving mode refers to an energy saving state or an energy saving mode in which power supply to a part or all of the components of the information processing terminal 20 is restricted. The non-operating state refers to a state in which operation (processing) is halted, and may refer to a state in which power is not supplied or a state in which the information processing terminal 20 is not activated. The operating state refers to a state in which power is supplied or the information processing terminal 20 is activated. The mediation unit 221 stores the recovery time of each app 21 in the recovery information storage unit 231 and sets up the recovery time in the clocking unit 222 and a monitoring unit 121 of the controller 11. Upon being notified by the clocking unit 222 that the recovery time of an app 21 has arrived, the mediation unit 221 refers to the recovery information storage unit 231 to identify the relevant app 21 associated with the recovery time, and the mediation unit 221 notifies the identified app 21 that the recovery time has arrived.

The clocking unit 222 uses a timer (clock) to monitor the arrival of the recovery time of an app 21 set up by the mediation unit 221, and when the recovery time arrives, the clocking unit 22 notifies the mediation unit 221 of arrival of the recovery time.

The control unit 223 controls power supply to the mediation unit 221 and the clocking unit 222. For example, the control unit 223 controls processes for switching the information processing terminal 20 to power-saving mode when a predetermined condition is satisfied, and controls processes for switching the information processing terminal 20 back to normal mode from power-saving mode when another condition is satisfied. The normal mode is a state in which the information processing terminal 20 is not in power-saving mode. The predetermined condition may be that the information processing terminal 20 is not operated for a certain period of time, for example. The other condition may be that the information processing terminal 20 is operated, or that some request has been generated from the controller 11 to the information processing terminal 20, for example.

The control unit 223 also receives a notification from the monitoring unit 121 that the recovery time of an app 21 has arrived. If the information processing terminal 20 is in power-saving mode when the control unit 223 receives such notification, the control unit 223 supplies power to the mediation unit 221 and the clocking unit 222 to cause the mediation unit 221 and the clocking unit 222 to transition from non-operating states to operating states. That is, when the information processing terminal 20 transitions to power-saving mode, not only the apps 21 but also the platform unit 22 transitions to a non-operating state, and as a result, the time monitoring operation by the clocking unit 222 is also halted. For this reason, the recovery time is set up in the monitoring unit 121 of the controller 11. Although the controller 11 also transitions to power-saving mode, the transition timing of the information processing terminal 20 to power-saving mode and the transition timing of the controller 11 to power-saving mode are asynchronous. Also, the monitoring unit 121 is configured to receive electric power even when the controller 11 transitions to power-saving mode. Thus, the monitoring unit 121 can always monitor the time to detect the arrival of the recovery time.

The install unit 224 controls installation or uninstallation of the app 21.

The controller 11 includes the monitoring unit 121. The monitoring unit 121 may be implemented by the CPU 111 executing a process based on one or more programs installed in the controller 11.

The monitoring unit 121 uses a timer (clock) to monitor the arrival of the recovery time set up by the mediation unit 221, and when the recovery time arrives, the monitoring unit 121 switches the information processing terminal 20 back to normal mode from power-saving mode via the control unit 223. Because the monitoring unit 121 operates in the controller 11, the monitoring unit 121 can monitor the arrival of the recovery time without being influenced by the information processing terminal 20 being in power-saving mode. That is, the monitoring unit 121 monitors the arrival of the recovery time independently of the clocking unit 222. In other words, the monitoring unit 121 and the clocking unit 222 monitor the arrival of the recovery time asynchronously. Asynchronous monitoring means that monitoring by one of the monitoring unit 121 or the clocking unit 222 does not depend on the other. For example, the monitoring unit 121 and the clocking unit 222 may each use different clocks to monitor the arrival of the recovery time.

Figure 4:
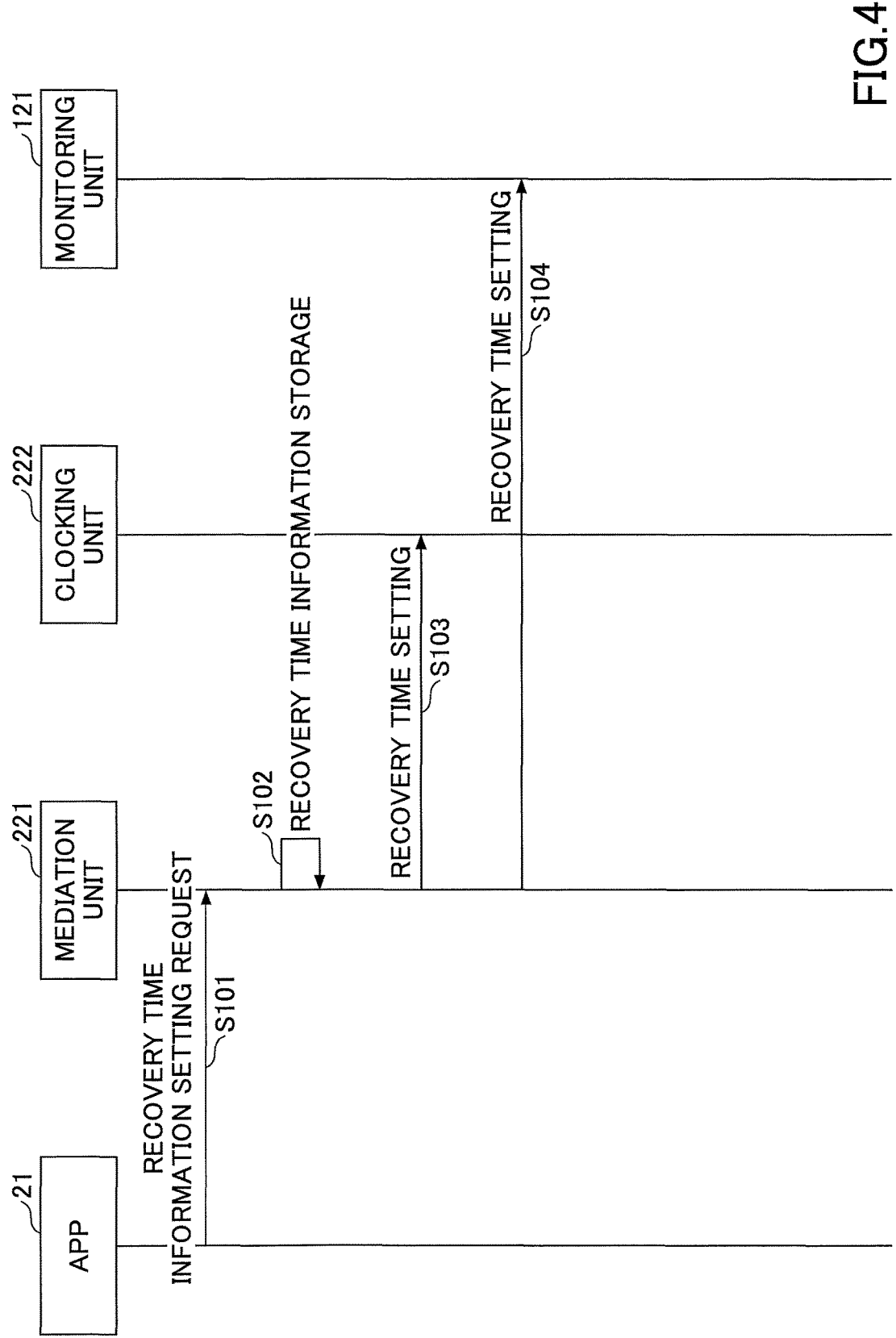
FIG. 4 is a sequence chart illustrating an example process sequence of a recovery time setting process.

In the following, process operations executed by the image forming apparatus 10 will be described. FIG. 4 is a sequence chart illustrating an example process sequence of a recovery time setting process implemented by the image forming apparatus 10.

A given app 21 that is to be set up as a recovery target app to receive a recovery time notification sends a recovery time information setting request to the mediation unit 221 to set up its recovery time information (step S101). Note that the process of step S101 may be executed at the time the information processing terminal 20 is activated or at the time the app 21 is installed in the information processing terminal 20, for example. Further, the recovery time information setting request for setting up the recovery time information may be made by calling the API of the platform unit 22, for example.

Then, the mediation unit 221 stores the recovery time information in the recovery information storage unit 231 (step S102).

FIGS. 5A and 5B are diagrams illustrating examples of the recovery time information. In FIGS. 5A and 5B illustrate two example sets of recovery time information each including information items, such as an app identifier, a reference time, and a time interval.

The app identifier is identification information of the app 21 for which the recovery time information is set up. The reference time is a reference time for a plurality of recovery times. The time interval indicates the time interval between the recovery times that occur at regular intervals based on the reference time.

For example, the recovery time information of FIG. 5A indicates the recovery time setting for an app 21 with the app identifier "jp.co.rrr.app1", and recovery times for this app 21 include "10:15", "13:15", "16:15", "19:15", "22:15", "01:15", "04:15", and "07:15", for example. The recovery time information of FIG. 5B indicates the recovery time setting for an app 21 with the app identifier "jp.co.rrr.app2", and recovery times for this app 21 include "11:15", "19:15", and "03:15", for example. In step S102, the recovery time information of FIG. 5A or FIG. 5B may be stored in the recovery information storage unit 231, for example.

Then, the mediation unit 221 sets up the nearest recovery time among the recovery times specified based on the recovery time information in the clocking unit 222 and the monitoring unit 121 (steps S103 and S104). For example, when the current time is 12:10 and the recovery time information of FIG. 5A is set up for the given app 21, the mediation unit 221 sets up "13:15" as the nearest recovery time in the clocking unit 222 and the monitoring unit 121. In the following descriptions, the nearest recovery time that is set up in the clocking unit 222 and the monitoring unit 121 is referred to as "target recovery time".

The clocking unit 222 and the monitoring unit 121 monitor the time to detect the arrival of the target recovery time. Note that in a case where the process of setting up the target recovery time in the monitoring unit 121 ends in failure, the mediation unit 221 may notify the app 21 of the failure in setting up the recovery time. Alternatively, the mediation unit 221 may re-execute the process of setting up the recovery time after a certain time period elapses, for example.

Note that in some embodiments, the mediation unit 221 may convert the recovery time information into a format that is easy to process and store the converted information in the recovery information storage unit 231 instead of storing the recovery time information as is, for example.

FIG. 6 is a diagram illustrating an example configuration of the recovery information storage unit 231. In FIG. 6, tables T1 and T2 are illustrated as example sets of information stored in the recovery information storage unit 231.

The table T1 is a table that stores a list (recovery time list) of recovery times specified based on the recovery time information of each app 21 that has its recovery time information set up.

The table T2 is a table that stores for each of the recovery times of the apps 21 listed in table T1, the app identifier of the app 21 that is set up to recover at the corresponding recovery time. Note that in FIG. 6, for the sake of convenience, the app identifier in the table T2 is represented by "(1)" or "(2)". However, the app identifier itself may alternatively be stored in the table T2.

Note that in some embodiments, only certain apps 21 may be permitted to make the recovery time setting request in step S101. For example, setting information of each app 21 may include a setting indicating whether the corresponding app 21 is permitted to call the API for making the recovery time setting request. Also, in some embodiments, when a recovery time information setting request is made by an app 21 having special authority (hereinafter referred to as "privileged app"), the mediation unit 221 may be configured to reject recovery time information setting requests from other apps 21. That is, the recovery time information setting request from the privileged app may be prioritized. In this case, when the recovery time information setting request from the privileged app is received, information relating to the other apps 21 stored in the recovery information storage unit 231 may be deleted, for example. Note that information on whether a given app 21 corresponds to a privileged app may be included in the setting information of the app 21, for example. Further, in some embodiments, a setting to permit only certain apps 21 to make the recovery time information setting request and/or a setting to prioritize the recovery time information setting request from a privileged app may be set up to be either valid or invalid, for example. In this case, depending on whether these settings are valid or invalid, only certain apps 21 may be permitted to make a recovery time information setting request and/or priority may be given to a recovery time information setting request from a privileged app, for example.

Also, for example, when an explicit setting cancellation request is received from an app 21 that has its recovery time information set up, the mediation unit 221 may delete the information associated with the app identifier of the corresponding app 21 from the recovery information storage unit 231. Also, when the mediation unit 221 is notified by the install unit 224 that a given app 21 has been uninstalled, the mediation unit 221 may delete information associated with the app identifier of the corresponding app 21 from the recovery information storage unit 231, for example. Also, the mediation unit 221 may delete all the information stored in the recovery information storage unit 231 when the power of the information processing terminal 20 is turned off or when the information processing terminal 20 is shut down or rebooted, for example. Note, however, that in the case where the recovery information storage unit 231 is implemented by the memory 202, for example, the information stored in the recovery information storage unit 231 may be deleted as a result of the power of the information processing terminal 20 being turned off even if the mediation unit 221 does not delete the information.

Figure 7:
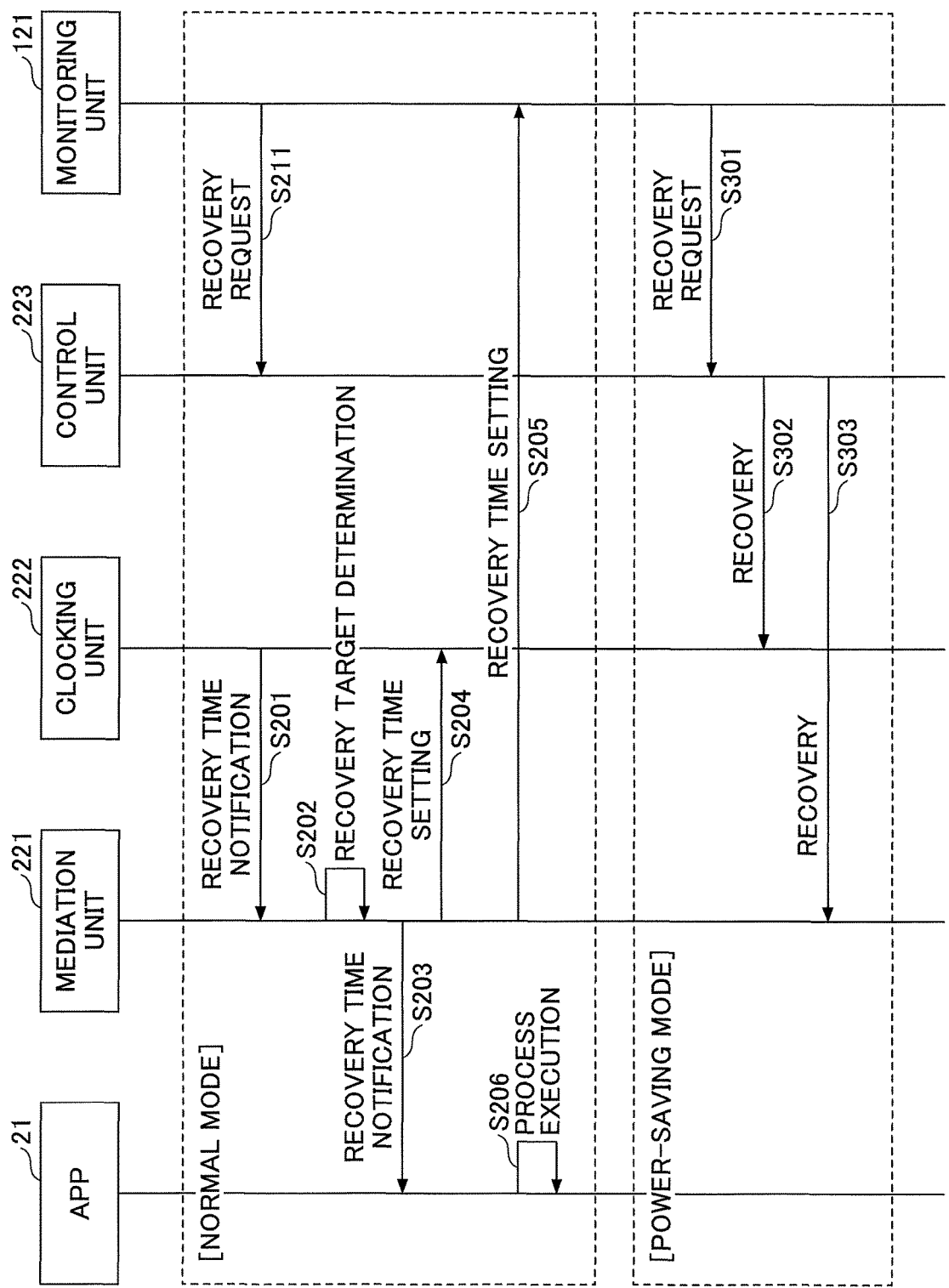
FIG. 7 is a sequence chart illustrating an example process sequence executed upon the arrival of a recovery time.

In the following, a process executed in response to the arrival of the recovery time will be described. FIG. 7 is a sequence chart illustrating example process operations to be executed upon the arrival of a recovery time of an app 21.

First, process operations that are executed in the case where the information processing terminal 20 is operating in normal mode when the target recovery time arrives will be described below. In this case, the clocking unit 222 can detect the arrival of the target recovery time. Thus, the clocking unit 222 notifies the mediation unit 221 that the target recovery time has arrived (step S201). In response to the recovery time notification from the clocking unit 222, the mediation unit 221 determines the app identifier of each app 21 corresponding to a recovery target app (step S202). For example, the app identifier can be determined by referring to the table T2 stored in the recovery information storage unit 231. Then, the mediation unit 221 notifies the app 21 identified by the app identifier determined in step S202 that the recovery time has arrived (step S203). If the app 21 receiving the recovery time notification is in a non-operating state, the mediation unit 221 controls the app 21 to recover to an operating state and notifies the app 21 that the recovery time has arrived. That is, after the app 21 makes a recovery time information setting request, if the information processing terminal 20 transitions to power-saving mode in the interim before the arrival of the recovery time, the app 21 may still be in a non-operating state even if the information processing terminal 20 has already switched back to normal mode, for example.

Note that the target recovery time is also set up in the monitoring unit 121. Thus, the monitoring unit 121 transmits a recovery request to the control unit 223 at the same timing as the notification timing of step S201 (step S211). The recovery request is a request to have the control unit 223 switched back to an operating state from a non-operation state if the information processing terminal 20 is in power-saving mode. Note, however, that in the present case, the information processing terminal 20 is in normal mode, and as such, the control unit 223 is in the operating state. Thus, in the present case, the control unit 223 discards (ignores) the recovery request.

After notifying the app 21 of the arrival of the target recovery time (step S203), the mediation unit 221 determines the next recovery time following the target recovery time in chronological order, and transmits the next recovery time as the new target recovery time to the clocking unit 222 and the monitoring unit 121 (steps S204 and S205). For example, the next recovery time can be determined by referring to the table T2. In this way, each time the target recovery time arrives, the next recovery time is set up in the clocking unit 222 and the monitoring unit 121. Note, however, that if the clocking unit 22 and the monitoring unit 121 are capable of monitoring a plurality of recovery times, the recovery times to be monitored may be set up all at once in the clocking unit 222 and the monitoring unit 121, for example.

Note that as with the recovery time "19:15" of the table T2 of FIG. 6, for example, when a given recovery time corresponds to the recovery time of a plurality of apps 21, such recovery time may only have to be set up once in the clocking unit 222 and the monitoring unit 121 as opposed to setting up the recovery time for each of the apps 21. That is, the recovery time set up in the clocking unit 222 and the monitoring unit 121 may be a logical sum of the recovery times of the apps 21 (obtained be removing duplicates).

Then, each app 21 that is notified of the arrival of the recovery time executes a process unique to the app 21 (step S206).

In the following, process operations that are performed in the case where the information processing terminal 20 is in power-saving mode when the target recovery time arrives will be described. In this case, the clocking unit 222 is in a non-operating state, and as such, the clocking unit 222 cannot detect the arrival of the target recovery time. However, the monitoring unit 121 resides in the controller 11, and as such, the monitoring unit 121 can transmit a recovery request to the control unit 223 based on the arrival of the target recovery time (step S301). In response to the recovery request, the control unit 223 recovers to the operating state from the non-operating state. When the control unit 223 fails to recover to the operating state, the monitoring unit 121 may store log information indicating the recovery failure in the HDD 114, for example.

Upon recovering to the operating state, the control unit 223 controls the clocking unit 222 and the mediation unit 221 to recover to the operating state from the non-operating state (steps S302 and S303). As a result, the clocking unit 222 goes back to monitoring the arrival of the target recovery time. Thereafter, the processes of steps S201 to S205 are executed by the clocking unit 222 and the mediation unit 221.

Note that in the case where the mediation unit 221 receives notification of the arrival of the target recovery time from the clocking unit 222 while the information processing terminal 20 is executing a process of transitioning to power-saving mode, the mediation unit 221 may refrain from notifying the corresponding app 21 associated with the target recovery time that the target recovery time has arrived and store information indicating that the target recovery time has arrived in the auxiliary storage device 203, for example. In this case, the information processing terminal 20 continues to execute the process of transitioning to power-saving mode. Thereafter, when the information processing terminal 20 transitions back to normal mode from power-saving mode, or when the process of transitioning to power-saving mode is discontinued, the mediation unit 221 may notify the corresponding app 21 associated with the target recovery time that the target recovery time has arrived based on the information stored in the auxiliary storage device 203, for example. In the process of transitioning to power-saving mode, the control unit 223 may issue a power-saving mode transition request to each of the functional elements (modules) included in the information processing terminal 20, and each of the functional elements may send a response to the control unit 223 indicating whether the transition to power-saving mode can be made. When at least one of the functional elements cannot be switched to power-saving mode, the process of transitioning to power-saving mode is discontinued.

Note that when the mediation unit 221 or the clocking unit 222 receives a power-saving mode transition request within a predetermined time range (e.g., 30 seconds) before and after the target recovery time, the mediation unit 221 or the clock unit 222 may be configured to reject the request to transition to power-saving mode, for example. In other words, the information processing terminal 20 may be prevented from transitioning to power-saving mode within a predetermined time range before and after the target recovery time. In this way, for example, a scenario may be prevented in which the recovery time of an app 21 arrives immediately after the mediation unit 221 sends a response to the control unit 223 indicating that transition to power-saving mode is possible such that the corresponding app 21 cannot recover to an operating state until the next recovery time. Also, a scenario may be prevented in which an app 21 has to recover to an operating state immediately after the information processing terminal 20 transitions to power-saving mode, for example. In this way, impact on the service life of components of the information processing terminal 20 may be reduced, for example.

Note that in some embodiments, the recovery time set up in the clocking unit 222 and the recovery time set up in the monitoring unit 121 may be different from each other. That is, the recovery time is set up in the monitoring unit 121 in order to cause the information processing terminal 20 to transition back to normal mode from power-saving mode. Thus, for example, based on each recovery time specified by the recovery time information, the mediation unit 221 may set up in the monitoring unit 121, a time slightly before (e.g., several minutes before) the recovery time. In this way, the clocking unit 222 may be able to detect the arrival of the recovery time without delay.

As described above, according to an aspect of the present embodiment, each app 21 can request the mediation unit 221 to set up times (recovery times) at which the app 21 should execute processes, and in this way, even if the app 21 transitions to a non-operating state thereafter, the app 21 can recover to an operating state at the relevant time. In this way, the app 21 installed in the information processing terminal 20, which is used as the operation unit of the image forming apparatus 10, may be less susceptible to influences of the information processing terminal 20 being in power-saving mode.

Note that aspects of the present embodiment may be applied to devices other than the image forming apparatus 10. For example, aspects of the present embodiment may be applied a device, such as a projector, a digital whiteboard, or a video conference system, that includes the information processing terminal 20 as an operation unit of the device.

Also, although the app 21 makes the request to set up its recovery time in the above-described embodiment, a program other than the app 21 may also make such a recovery time setting request.

Further, the image forming apparatus 10 of the above-described embodiment is an example of a device. The information processing terminal 20 is an example of an operation unit. The clocking unit 222 is an example of a processor executing a first monitoring process. The mediation unit 221 is an example of the processor executing a setting process. The monitoring unit 121 is an example of the processor executing a second monitoring process. The recovery time is an example of a first time and a second time. The controller 11 is an example of an information processing system.

Note that a person skilled in the field of information processing technology may implement the present invention using an application specific integrated circuit (ASIC) or an apparatus in which circuit modules are connected.

Further, each of the functions (units) described in connection with the above embodiments may be implemented by one or more circuits.

The one or more circuits described above may include a processor programmed by software to execute a corresponding function, and/or hardware, such as an ASIC or a circuit module, designed to execute a corresponding function, for example.

Although the present invention has been described above with reference to certain illustrative embodiments, the present invention is not limited to these embodiments, and numerous variations and modifications may be made without departing from the scope of the present invention.

What is claimed is:
1. A system comprising:
a device including a first processor that is configured to communicate with a mobile terminal, and
the mobile terminal, said mobile terminal comprising:

an operation unit having a program installed therein and including a second processor that is different from the first processor and configured to execute:
a first monitoring process of monitoring an arrival of a first time that is set up in advance; and
a setting process of setting up the first time to be monitored in the first monitoring process in response to a request from the program;
wherein when the arrival of the first time is detected in the first monitoring process, the setting process causes the program to recover from a transitioned state to which the program transitions when the operation unit is in a power-saving mode.

2. The system according to claim 1, wherein
the setting process sets up the first time to be monitored in the first monitoring process for each of a plurality of programs installed in the operation unit in response to a request from each of the plurality of programs; and
when the arrival of the first time set up for at least one program of the plurality of programs is detected in the first monitoring process, the setting process causes the at least one program associated with the detected first time to recover from the transitioned state.

3. The system according to claim 1, wherein
the second processor is further configured to execute a second monitoring process of monitoring an arrival of a second time that is set up in advance without being influenced by the power-saving mode of the operation unit;
the first monitoring process stops monitoring the arrival of the first time when the operation unit transitions to the power-saving mode;
the setting process sets up the second time to be monitored in the second monitoring process in response to the request from the program; and
when the arrival of the second time is detected in the second monitoring process, the second monitoring process causes the first monitoring process to resume monitoring the arrival of the first time.

4. The system according to claim 3, wherein the first monitoring process monitors the first time and the second monitoring process monitors the second time in an asynchronous manner.

5. The device according to claim 1, wherein the operation unit refrains from transitioning to the power-saving mode during a predetermined time range with respect to the first time.

6. The system according to claim 1, wherein the first time is timing to cause the program in the power-saving mode to recover from the transitioned state to an operating state.

7. The system according to claim 1, wherein the device is an imaging forming apparatus and the mobile terminal functions as an operation unit of the image forming apparatus when the communicating with the image forming apparatus.

8. An information processing method to be implemented by a system comprising:
a device including a first processor that is configured to communicate with a mobile terminal; and
the mobile terminal including an operation unit having a program installed therein, the information processing method comprising:
a first monitoring process, performed by a second processor of the mobile terminal, of monitoring an arrival of a first time that is set up in advance; and
a setting process, performed by the second processor of the mobile terminal, of setting up the first time to be monitored in the first monitoring process in response to a request from the program;
wherein when the arrival of the first time is detected in the first monitoring process, the setting process causes the program to recover from a transitioned state to which the program transitions when the operation unit is a power-saving mode.

9. The information processing method according to claim 8, wherein
the setting process sets up the first time to be monitored in the first monitoring process for each of a plurality of programs installed in the operation unit in response to a request from each of the plurality of programs; and
when the arrival of the first time set up for at least one program of the plurality of programs is detected in the first monitoring process, the setting process causes the at least one program associated with the detected first time to recover from the transitioned state.

10. The information processing method according to claim 8, further comprising:
a second monitoring process of monitoring an arrival of a second time that is set up in advance without being influenced by the power-saving mode of the operation unit;
wherein the first monitoring process stops monitoring the arrival of the first time when the operation unit transitions to the power-saving mode;
wherein the setting process sets up the second time to be monitored in the second monitoring process in response to the request from the program; and
wherein when the arrival of the second time is detected in the second monitoring process, the second monitoring process causes the first monitoring process to resume monitoring the arrival of the first time.

11. The information processing method according to claim 10, wherein the first monitoring process monitors the first time and the second monitoring process monitors the second time in an asynchronous manner.

12. The information processing method according to claim 8, wherein the operation unit refrains from transitioning to the power-saving mode during a predetermined time range with respect to the first time.

13. A computer program product comprising a non-transitory computer-readable medium having computer-readable instructions recorded thereon that are executable by system comprising: a device including a first processor that is configured to communicate with a mobile terminal; and the mobile terminal including an operation unit having a program installed therein, the computer-readable instructions causing the device to implement:
a first monitoring process, performed by a second processor of the mobile terminal, of monitoring an arrival of a first time that is set up in advance; and
a setting process, performed by the second processor of the mobile terminal, of setting up the first time to be monitored in the first monitoring process in response to a request from the program;
wherein when the arrival of the first time is detected in the first monitoring process, the setting process causes the program to recover from a transitioned state to which the program transitions when the operation unit is in a power-saving mode.

14. The computer program product according to claim 13, wherein
the setting process sets up the first time to be monitored in the first monitoring process for each of a plurality of programs installed in the operation unit in response to a request from each of the plurality of programs; and when the arrival of the first time set up for at least one program of the plurality of programs is detected in the first monitoring process, the setting process causes the at least one program associated with the detected first time to recover from the transitioned state.

15. The computer program product according to claim 13, wherein the computer-readable instructions further causes the device to implement a second monitoring process of monitoring an arrival of a second time that is set up in advance without being influenced by the power-saving mode of the operation unit;

the first monitoring process stops monitoring the arrival of the first time when the operation unit transitions to the power-saving mode;

the setting process sets up the second time to be monitored in the second monitoring process in response to the request from the program; and when the arrival of the second time is detected in the second monitoring process, the second monitoring process causes the first monitoring process to resume monitoring the arrival of the first time.

16. The computer program product according to claim 15, wherein the first monitoring process monitors the first time and the second monitoring process monitors the second time in an asynchronous manner.

17. The computer program product according to claim 13, wherein the operation unit refrains from transitioning to the power-saving mode during a predetermined time range with respect to the first.

* * * * *